US012670346B2

(12) United States Patent
Pita Lozano et al.

(10) Patent No.: US 12,670,346 B2
(45) Date of Patent: Jun. 30, 2026

(54) CONSUMER PRODUCT PACKAGING WITH A VISIBLE CODE, SYSTEM COMPRISING THE PACKAGING AND METHOD FOR FRAMING THE VISIBLE CODE

(71) Applicant: NUEVOS SISTEMAS TECNOLÓGICOS S.L., Murcia (ES)

(72) Inventors: Javier Pita Lozano, Murcia (ES); Juan Manuel Saez Martínez, Murcia (ES)

(73) Assignee: NUEVOS SISTEMAS TECNOLÓGICOS S.L., Murcia (ES)

( * ) Notice: Subject to any disclaimer, the term of this patent is extended or adjusted under 35 U.S.C. 154(b) by 18 days.

(21) Appl. No.: 18/853,965

(22) PCT Filed: Apr. 3, 2023

(86) PCT No.: PCT/ES2023/070216
§ 371 (c)(1),
(2) Date: Aug. 28, 2025

(87) PCT Pub. No.: WO2023/194638
PCT Pub. Date: Oct. 12, 2023

(65) Prior Publication Data
US 2025/0245455 A1 Jul. 31, 2025

(30) Foreign Application Priority Data
Apr. 8, 2022 (ES) ............................ ES202230601U

(51) Int. Cl.
*G06K 7/10* (2006.01)
*G06K 7/14* (2006.01)
*G06K 19/06* (2006.01)

(52) U.S. Cl.
CPC ....... *G06K 7/10722* (2013.01); *G06K 7/1417* (2013.01); *G06K 19/06037* (2013.01)

(58) Field of Classification Search
CPC ............. G06K 7/10722; G06K 7/1417; G06K 19/06037; G06K 7/1443; G06K 19/06;
(Continued)

(56) References Cited

U.S. PATENT DOCUMENTS

| | | | | |
|---|---|---|---|---|
| 2013/0037619 A1* | 2/2013 | Key | .................... | G09F 3/0297 |
| | | | | 235/487 |
| 2019/0294936 A1* | 9/2019 | Saez Martínez | ............................ | |
| | | | | G06K 19/06037 |

FOREIGN PATENT DOCUMENTS

| | | |
|---|---|---|
| CN | 101474020 A | 7/2009 |
| KR | 101612054 B1 | 4/2016 |
| WO | WO-2022112606 A1 * | 6/2022 ........... G06K 7/1417 |

OTHER PUBLICATIONS

Elgendy et al. "Indoor Navigation for People with Visual Impairment using Augmented Reality Markers" 10th IEEE International Conference on Cognitive Infocommunications, Oct. 23-25, 2019, pp. 425-430.

(Continued)

*Primary Examiner* — Kristy A Haupt
(74) *Attorney, Agent, or Firm* — CANTOR COLBURN LLP

(57) ABSTRACT
A packaging for a consumer product is provided with: a first visible code, the first visible code being associated with a first maximum reading distance of a camera and a first information density; and a second visible code having a second maximum distance reading distance and a second information density. The first maximum distance is less than the second maximum distance, and the first information density is greater than the second information density. A system having the packaging and a camera and a method for using the system are also related.

14 Claims, 7 Drawing Sheets

(58) Field of Classification Search
CPC ............. B65D 2203/06; G06V 10/243; G06V
10/225; G06V 10/245; G06V 10/00
See application file for complete search history.

(56) References Cited

OTHER PUBLICATIONS

International Search Report for Application No. PCT/ES2023/
070216, dated Jun. 2, 2023, 3 pages, English translation.

* cited by examiner

Q1

Q2

Q1

Q2

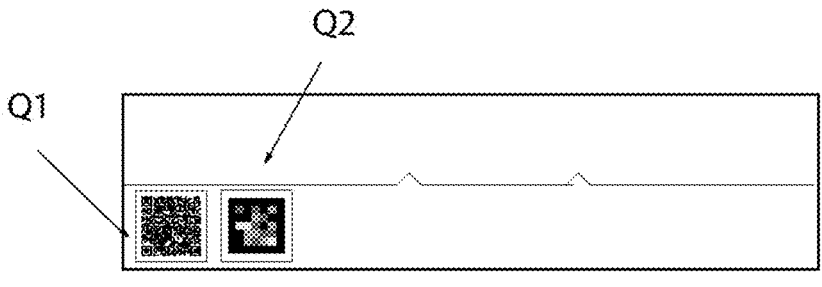
FIG. 15
TM   CA   L2
FIG. 16
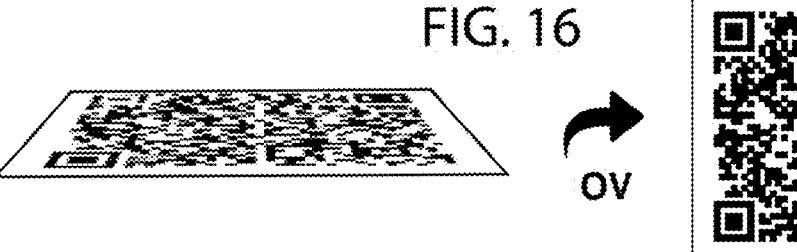
Q1    OV    Q1
FIG. 17
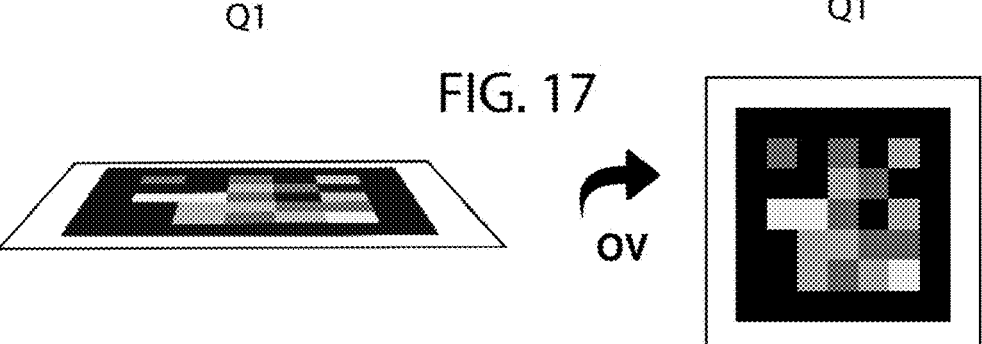
Q2    OV    Q2

CONSUMER PRODUCT PACKAGING WITH A VISIBLE CODE, SYSTEM COMPRISING THE PACKAGING AND METHOD FOR FRAMING THE VISIBLE CODE

CROSS-REFERENCE TO RELATED APPLICATIONS

This application is a 35 U.S.C. § 371 National Stage patent application of PCT/ES2023/070216, filed on 3 Apr. 2023, which claims the benefit of Spanish patent application U202230601, filed on 8 Apr. 2022, the disclosures of which are incorporated herein by reference in their entirety.

TECHNICAL FIELD

The present disclosure relates to packaging for consumer products provided with codes that contain information relating to the product and particularly to codes that have high information density or are hard to read, requiring a minimum of focusing by an optical device for reading or scanning same.

BACKGROUND

Consumer products comprising outer packaging, the outer packaging being provided with a first visible code, the first visible code having associated therewith a first maximum reading distance of a camera and a first information density, are known. In other words, for a given camera with a given degree of focus, the camera has to be located at a distance from the code that is smaller than or equal to a given distance in order to be able to extract the information contained in the code.

Therefore, if a user is near a supermarket display rack and wants to obtain information about a product displayed on the shelf, he/she must first locate the code with the information, focus his/her camera thereon in order to be able to obtain its content.

However, if the person is visually impaired or simply unable to see, even with the product in hand, he/she will have difficulty locating the code or it will simply be impossible to do so.

The present disclosure proposes a solution to this significant drawback.

Consumer product is understood herein as any physical product that can be acquired by a consumer, and particularly products that are likely to be displayed or stocked in stores, on shelves, display racks, or counters. Therefore, it includes, among others, food products, drugstore products, personal hygiene products, or medicines, and in general any product having visible surfaces with the possibility of supporting printed codes or codes adhered by means of an adhesive. In that sense, consumer product can also include clothing, leisure products, sporting goods, etc.

SUMMARY

To overcome the drawbacks of the state of the art, a first aspect of the present disclosure proposes a packaging for a consumer product, the outer packaging being provided with a first visible code, the first visible code having associated therewith a first maximum reading distance of a camera and a first information density, comprising a second visible code having a second maximum reading distance of the camera and a second information density, and wherein:

the first maximum distance is smaller than the second maximum distance; and the first information density is greater than the second information density.

Therefore, the product has a visible code that can be seen from a great distance, containing information about the location of the other code, which is not visible from far away as it contains much more information than the second code. Once the device has the information to locate the first code, it is now possible to focus on the first code either by means of the same camera by optical focusing or by using another camera having a longer range and a smaller field of view.

The first code, which contains relevant information about the product itself, can be of many types:

In some embodiments, the first visible code is a QR code, or a Data Matrix code, or a barcode.

In some embodiments, the first visible code is a date.

In some embodiments, the second visible code is a multicolor code.

In some embodiments, the second visible code is a long-range code.

In some embodiments, the second visible code is a square matrix demarcated in one or two frames.

In some embodiments, one of the frames is black.

The disclosure also relates to a system comprising a product according to any of the aforementioned variants and a camera.

In some embodiments of the system, the device is configured to carry out the steps of:

a) detecting and reading the second visible code with the camera being arranged at a distance greater than the first maximum distance and smaller than the second maximum distance;

b) extracting from the second visible code information relating to the relative position of the first visible code with respect to the second visible code;

c) framing based on said information the image region in which the first visible code is located.

In some embodiments of the system, step c) is performed by focusing on the image region in which the first visible code is located.

In some embodiments of the system, the device is configured to perform an additional step of extracting the information contained in the first visible code based on the framing.

In some embodiments of the system, the device is configured to perform a subsequent step consisting of displaying an enlarged image of the first visible code on a screen.

Finally, in some embodiments of the system, the first code and the second code are arranged in an oblique plane with respect to the line of view of the camera and the device is configured to obtain, after step b), information about the orientation of the second code, a transformation that converts the image of the second code into a vertical representation (perpendicular to the line of view of the camera) is inferred, and to apply, after step c), the same transformation (OV) to the image of the first visible code (Q1).

The different aspects and embodiments of the disclosure defined above may be combined together, provided that they are mutually compatible.

Additional advantages and features of the disclosure will become apparent from the detailed description that follows and will be particularly indicated in the attached claims.

BRIEF DESCRIPTION OF THE DRAWINGS

As a complement to the description, and for the purpose of helping to make the features of the disclosure more readily understandable, in accordance with practical exemplary embodiments of the disclosure, said description is accompanied by a set of figures which, by way of illustration and not limitation, represent the following:

FIG. 15 shows a plan view of the system according to the disclosure in a configuration in which the codes are located on an upper surface of the product.

FIGS. 16 and 17 depict the transformation performed in the reading device when it detects that the second code, visible from far away, is being focused on obliquely.

DETAILED DESCRIPTION OF THE DRAWINGS

In the description of the possible preferred embodiments of the disclosure, numerous details must be provided to better understand the disclosure. Even so, it will be apparent to the person skilled in the art that the disclosure can be implemented without these specific details. On the other hand, well-known features have not been described in detail to avoid unnecessarily complicating the description.

Figures 1, 2:
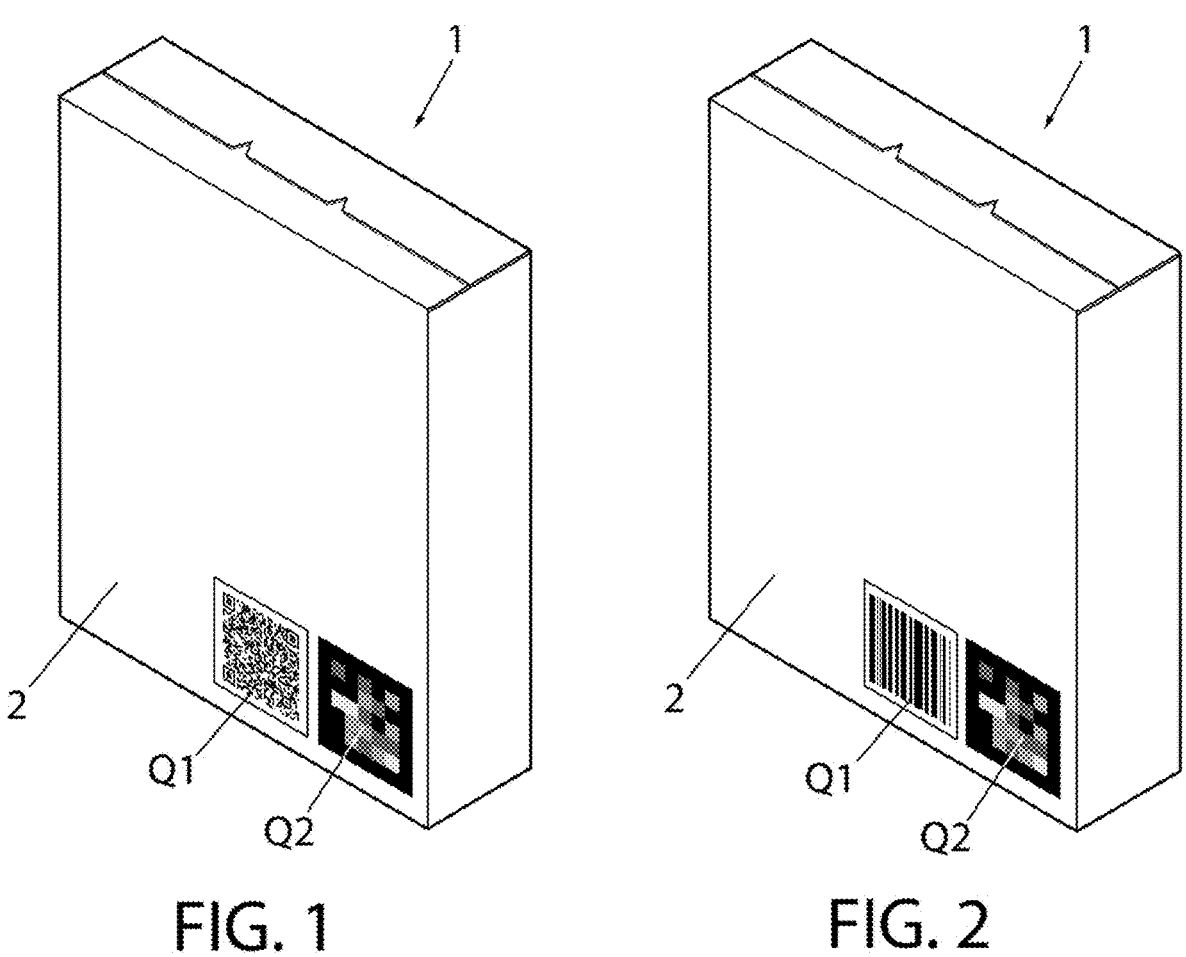
FIG. 1 shows a consumer product according to the disclosure in which the first code is a QR code.
FIG. 2 shows a consumer product according to the disclosure in which the first code is a barcode.
Figure 3:
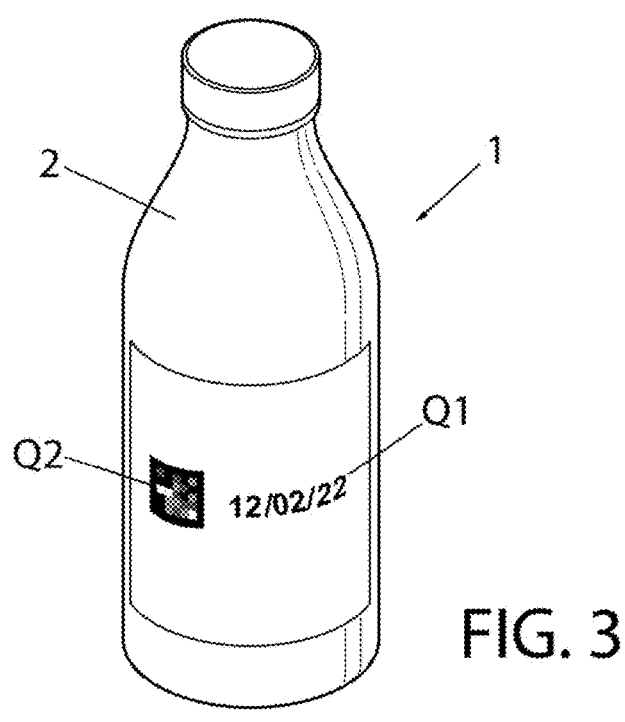
FIG. 3 shows a consumer product according to the disclosure, in this case a bottle, in which the first code is a date.

As shown in FIGS. 1 to 3, the disclosure relates to a packaging 2 for a consumer product 1, the packaging 2 being provided with a first visible code Q1, the first visible code Q1 having associated therewith a first maximum reading distance L1 of a camera CA and a first information density D1, characterized in that it comprises a second visible code Q2 having a second maximum reading distance L2 of the camera CA and a second information density D2, and wherein:

the first maximum distance L1 is smaller than the second maximum distance L2; and the first information density D1 is greater than the second information density D2.

In all the embodiments, each pair of the first code Q1 and the second code Q2 are arranged adjacent to one another and in the same plane, with several pairs of the first code Q1 and the second code Q2 being able to exist together on the same product. Therefore, the product can be placed in different ways and it will still be possible to locate it.

The first visible code Q1 is a QR code such as, for example, the one shown in FIG. 1, or a Data Matrix code, or a MaxiCode or a PDF417 code, or an Aztec code or a barcode, such as the one shown in FIG. 2.

As shown in FIG. 3, the application of the disclosure can also be applied to cases in which the first visible code Q1 is a text, such as a date.

Figure 13:
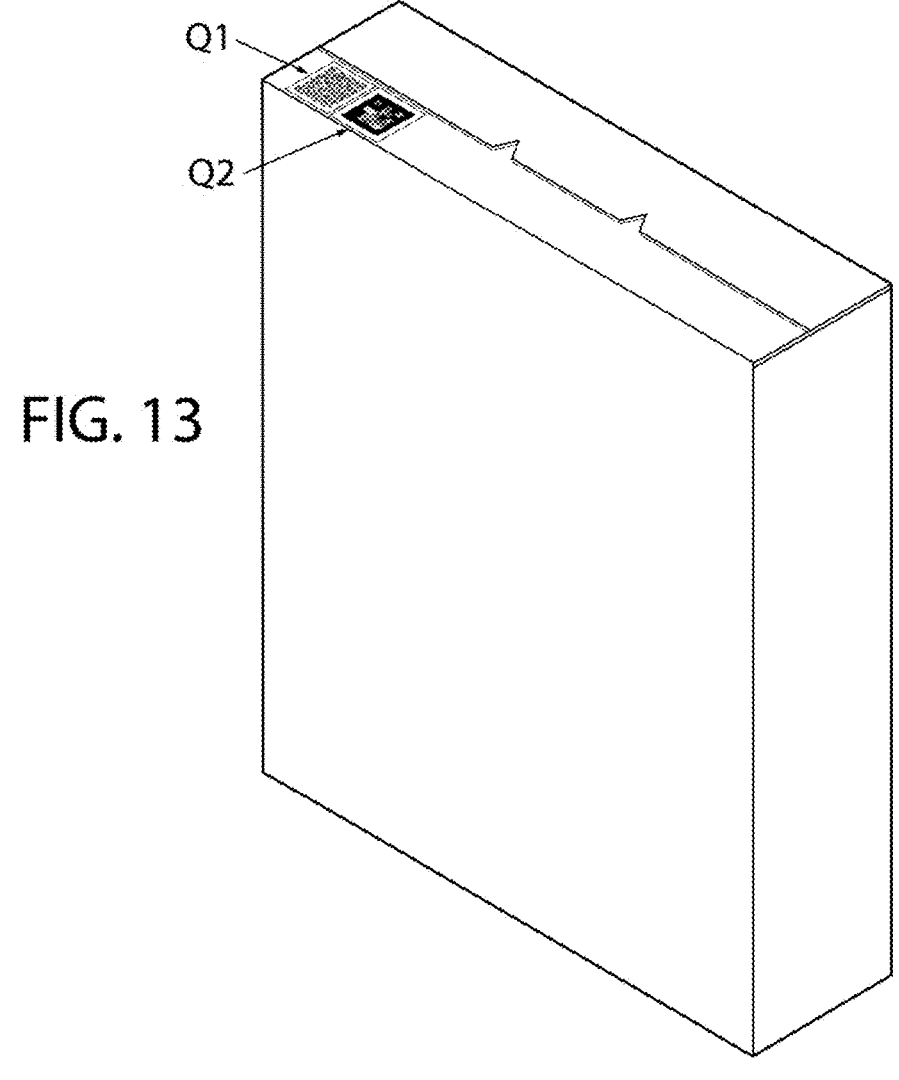
FIG. 13 shows a possible embodiment of the product according to the disclosure, in which the codes Q1 and Q2 can also be arranged on another part of the product.

As shown in FIG. 13, the first code Q1 and the second code Q2 can be arranged in the upper part of the product, or they can exist together on various surfaces of the product with different orientations. As discussed below, this will involve an additional step in the method according to the disclosure.

Figure 9:
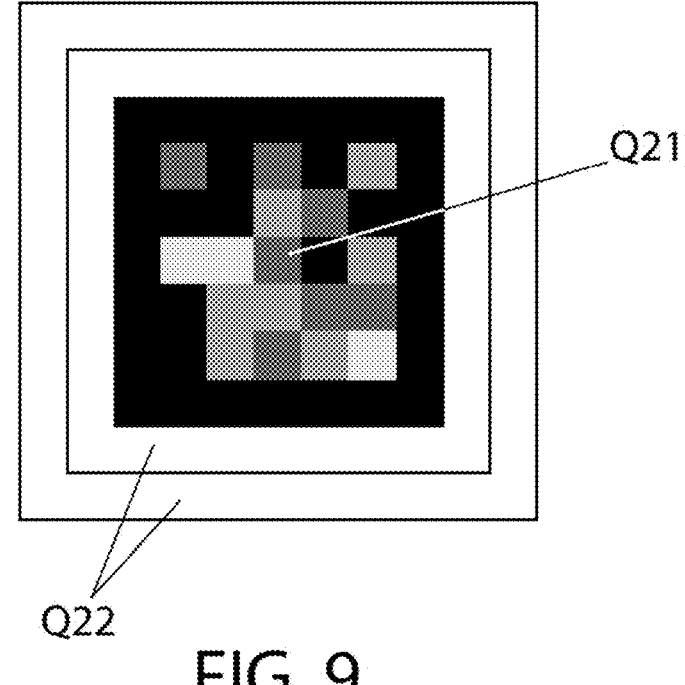
FIG. 9 shows a way to implement the second code.
Figure 10:
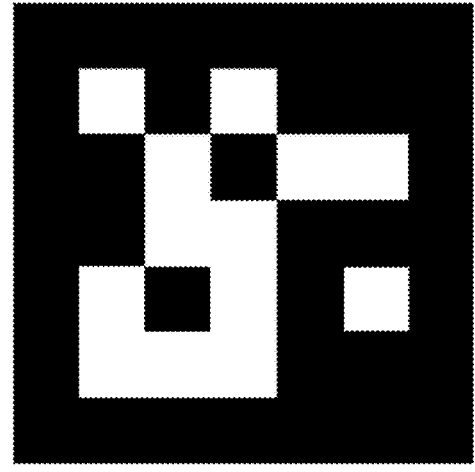
FIGS. 10 to 12 shows other examples of low-density codes.
Figure 11:
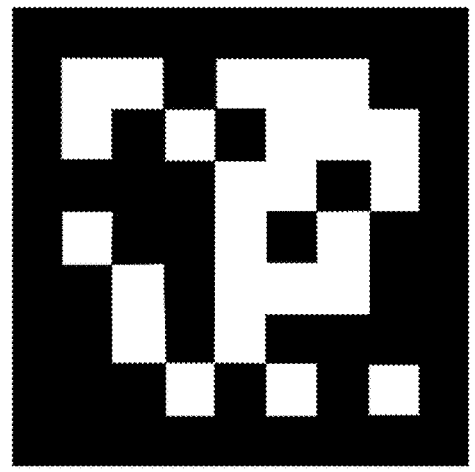
Figure 12:
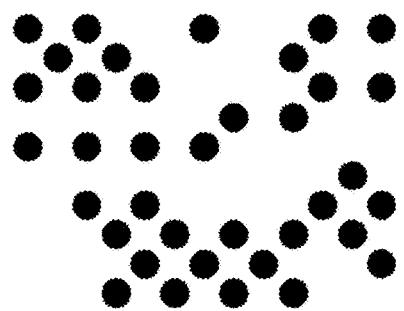

As shown in FIG. 9, the second visible code Q2 is a multicolor code, with a square matrix Q21 demarcated in one or two frames Q22, and preferably the pixels of the matrix Q21 are cyan, magenta, yellow, or black in color. In particular, one of the frames Q22 is a light color frame and the other a dark color frame.

Figure 4:
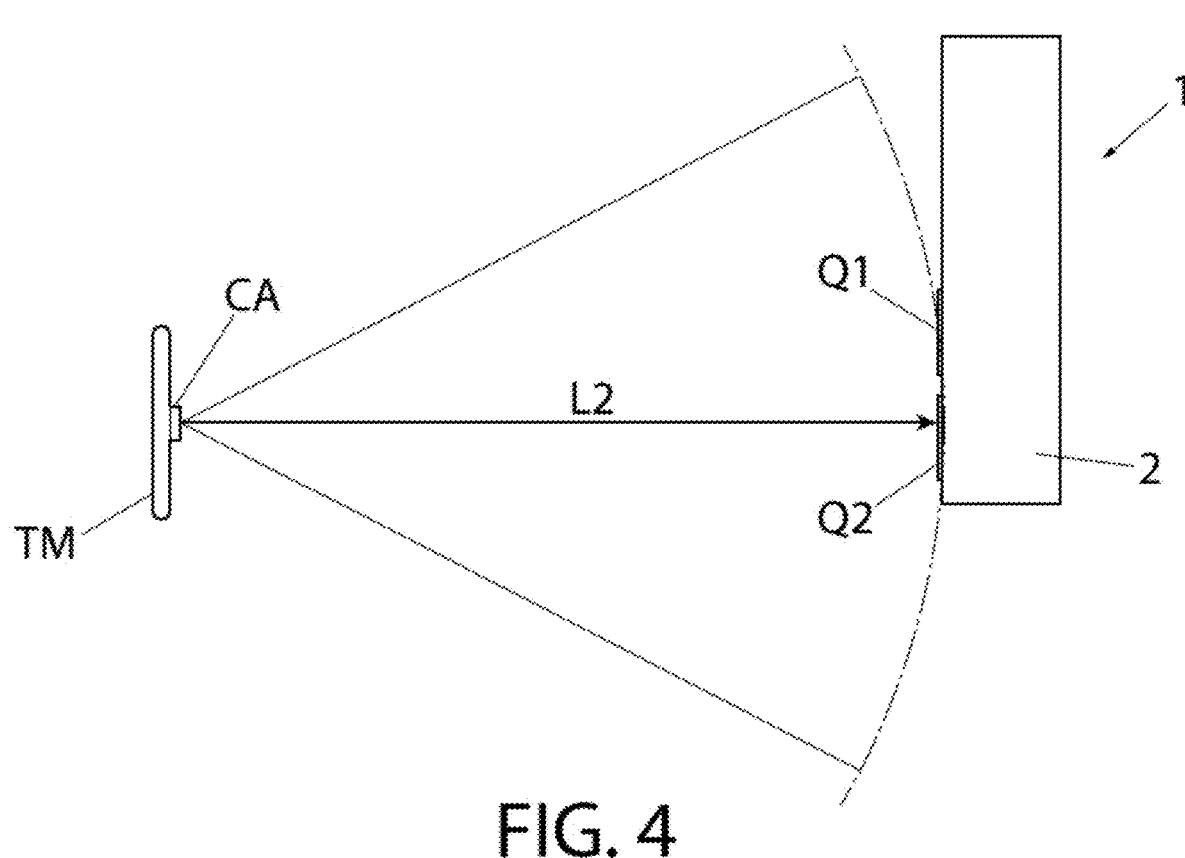
FIG. 4 is a plan view of the system according to the disclosure.
Figure 6:
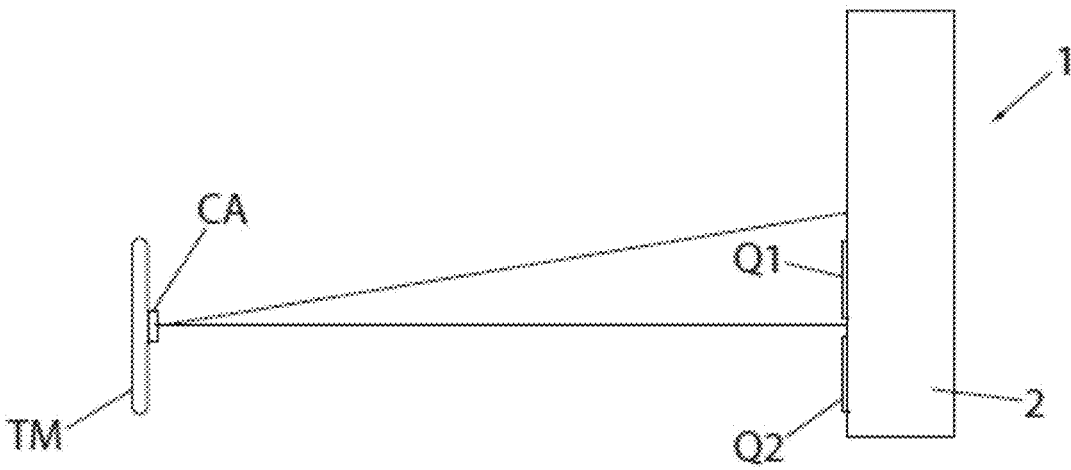
FIG. 6 shows how the camera views the codes when it is located at a smaller distance from the product or when it has focused on the code containing the information.
Figure 7:
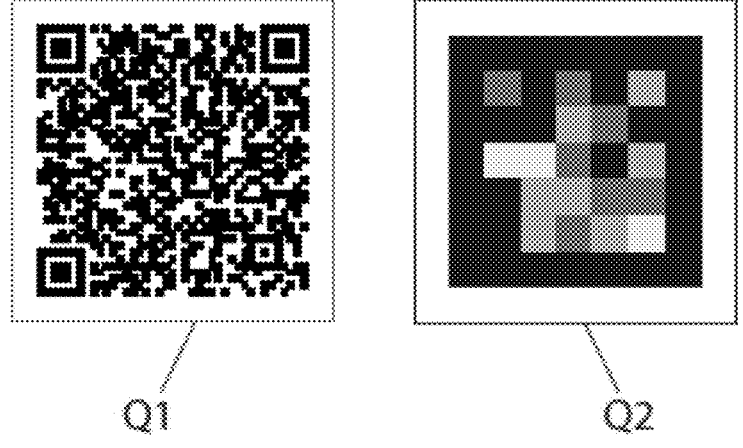
FIG. 7 shows how the camera views the codes.
Figure 8:
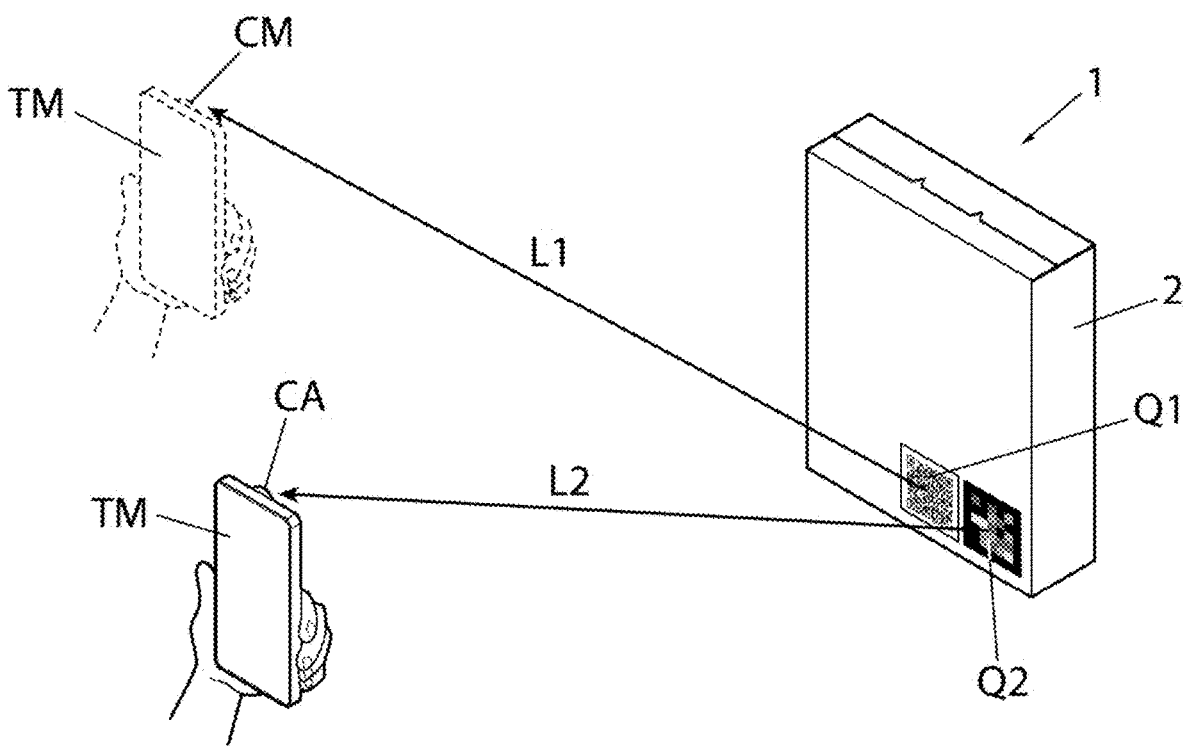
FIG. 8 illustrates the system of the disclosure.

As shown in FIG. 4, 6, or 8, the disclosure also relates to a system comprising a packaging 2 for a product 1 according to any of the mentioned embodiments and a camera CA.

Figure 5:
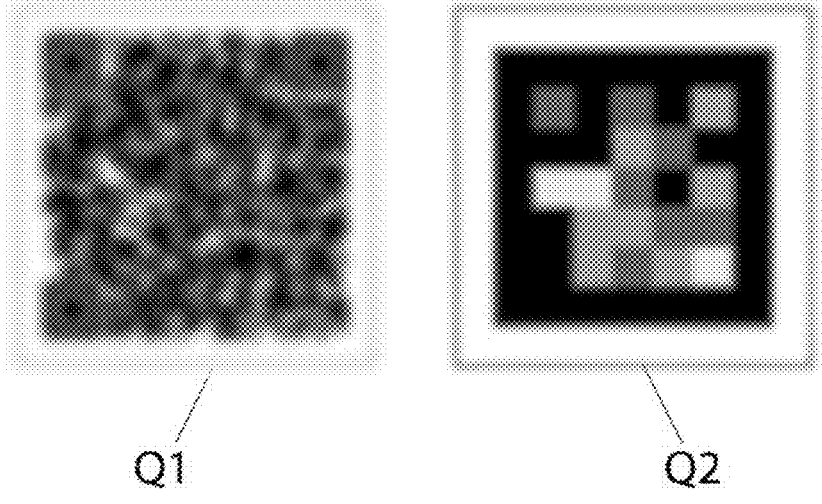
FIG. 5 shows how the camera views the codes when it is located at a great distance from the product.

FIGS. 4 and 5 show how the system works. First, the user points the camera of his/her mobile telephone TM towards a sector where the codes of consumer products 1 may be located. This figure schematically shows that the camera CA has a wide field of view and that it can detect, at a distance L2, the code Q2 which has a low information density but can be detected at a great distance. At the distance L2, as shown in FIG. 5, the camera is unable to distinguish Q1, since the first maximum distance L1 is smaller than the second maximum distance L2.

Therefore, the system carries out the steps of:

a) detecting and reading the second visible code Q2 with the camera CA being arranged at a distance greater than the first maximum distance L1 and smaller than the second maximum distance L2;

b) extracting from the second visible code Q2 information relating to the relative position of the first visible code Q1 with respect to the second visible code Q2;

c) framing based on said information the image region in which the first visible code Q1 is located.

From that moment on, the system can extract the information contained in the first visible code Q1 based on the framing. Said information can be stored, processed by the device TM itself, or sent to the user by means of voice messages.

According to another embodiment of the system, the device can display an enlarged image of the first visible code Q1 on a screen, such that the device works as a smart magnifier, i.e., statically displaying on screen only the relevant information such as, for example, a date, so that the user can see said date suitably magnified.

According to another embodiment of the system, it is envisaged to apply the inventive concept to a product such as the one shown in FIG. 13, in which the first code Q1 and the second code Q2 are arranged in an oblique plane with respect to the line of view of the camera CA. This arrangement means that the direction normal to the plane forms a non-zero angle with respect to the optical axis of the camera.

Figure 14:
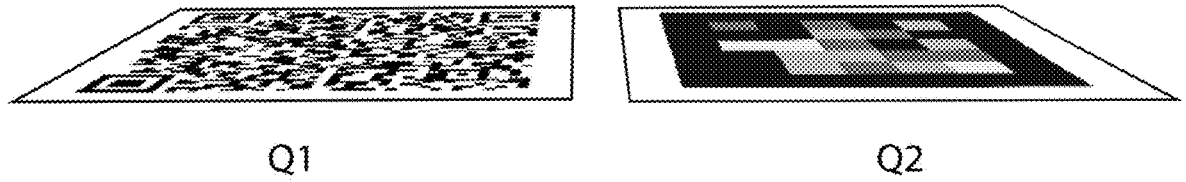
FIG. 14 shows how a camera would view codes arranged on a horizontal surface.

In this case, as illustrated by means of FIGS. 14 to 17, the camera "will view" the codes as shown in FIG. 14. In this case, both maximum reading distances L1 and L2 will be smaller, but the distance L2 corresponding to the second code Q2 will still be greater. As can be seen in these very figures, the oblique image obtained also allows knowing which will be the transformation to be applied to the first code Q1 in order to be able to extract information relating to the product 1 from this code. In other words, the image of the second code not only allows locating and focusing on the first code Q1, but it also allows knowing its orientation, since they are both arranged adjacent to one another in the same plane.

Therefore, preferably, it is envisaged that after step b), information about the orientation of the second code Q2 is obtained, a transformation OV that converts the image of the second code Q2 into a vertical representation (perpendicular to the line of view of the camera) is inferred, and that after step c), the same transformation OV is applied to the image of the first visible code Q1.

In view of this description and figures, the person skilled in the art may understand that the disclosure has been described according to some preferred embodiments thereof, but that multiple variations may be introduced in said preferred embodiments, without leaving the object of the disclosure as claimed.

In this text, the term "comprise(s)" and its derivations (such as "comprising", etc.) should not be understood in an exclusive sense. That is to say, these terms should not be interpreted as excluding the possibility that what is described and defined may include more elements, stages, etc.

The invention claimed is:

1. A packaging for a consumer product, the packaging comprising a first visible code, the first visible code having associated therewith a first maximum reading distance of a camera and a first information density, wherein the packaging further comprises a second visible code having a second maximum reading distance of the camera and a second information density, and wherein:

the first maximum distance is smaller than the second maximum distance;

the first information density is greater than the second information density;

and the second visible code contains information relating to the relative position of the first visible code with respect to the second visible code.

2. The packaging according to claim 1, wherein the first visible code is a high-density code such as a QR code, a Data Matrix code, a barcode, a MaxiCode, a PDF417 code, or an Aztec code.

3. The packaging according to claim 1, wherein the first visible code is a date.

4. The packaging according to claim 1, wherein the second visible code is a long-range code such as an ArUCo code, AprilTag, ARTag, ARToolKit, or ddTags.

5. The packaging according to claim 1, wherein the first code and the second code are arranged adjacent to one another and in the same plane, with several pairs of the first code and the second code being able to exist together on the product.

6. A system comprising a packaging according to claim 1 and a device provided with a camera.

7. The system according to claim 6, wherein the device is configured to carry out the following steps:

a) detecting and reading the second visible code with the camera being arranged at a distance greater than the first maximum distance and smaller than the second maximum distance;

b) extracting from the second visible code information relating to the relative position of the first visible code with respect to the second visible code;

c) framing based on said information the image region in which the first visible code is located; and d) extracting information contained in the first visible code based on the framing.

8. The system according to claim 7, wherein the device is configured to perform a subsequent step consisting of displaying an enlarged image of the first visible code on a screen.

9. The system according to claim 7, wherein the first code and the second code are arranged in an oblique plane with respect to the line of view of the camera, wherein the device is configured to obtain, after step b), information about the orientation of the second code, infer a transformation that converts the image of the second code into a vertical representation, and to apply, after step c), the same transformation to the image of the first visible code.

10. The system according to claim 7, wherein in step c) the device is configured to focus on the image region in which the first visible code is located.

11. A method for framing a visible code, the visible code being arranged in the packaging according to claim 1, wherein a device provided with a camera is used, the method including the following steps:

a) detecting and reading the second visible code with the camera being arranged at a distance greater than the first maximum distance and smaller than the second maximum distance;

b) extracting from the second visible code information relating to the relative position of the first visible code with respect to the second visible code;

c) framing based on said information the image region in which the first visible code is located; and d) extracting information contained in the first visible code based on the framing.

12. The method according to claim 11, wherein step c) is performed by focusing on the image region in which the first visible code is located.

13. The method according to claim 12, comprising a subsequent step consisting of displaying an enlarged image of the first visible code on a screen.

14. The method according to claim 11, wherein the first code and the second code are arranged in an oblique plane with respect to the line of view of the camera, wherein, after step b), information about the orientation of the second code is obtained, a transformation that converts the image of the second code into a vertical representation is inferred, and wherein, after step c), the same transformation is applied to the image of the first visible code.

* * * * *